United States Patent [19]

Mayer et al.

[11] Patent Number: 5,075,345

[45] Date of Patent: Dec. 24, 1991

[54] PROCESS FOR THE PREPARATION OF POLYURETHANE (UREA) MASSES WHICH CONTAIN FOAM

[75] Inventors: Eduard Mayer, Dormagen; Manfred Dietrich, Leverkusen; Walter Meckel, Neuss, all of Fed. Rep. of Germany

[73] Assignee: Bayer Aktiengesellschaft, Leverkusen, Fed. Rep. of Germany

[21] Appl. No.: 625,583

[22] Filed: Dec. 11, 1990

[30] Foreign Application Priority Data

Dec. 19, 1989 [DE] Fed. Rep. of Germany ....... 3941788

[51] Int. Cl.$^5$ .............................................. C08G 18/14
[52] U.S. Cl. .................................................... 521/159
[58] Field of Search ........................................ 521/159

[56] References Cited

U.S. PATENT DOCUMENTS

| | | | |
|---|---|---|---|
| 4,608,397 | 8/1986 | Reischl | 521/101 |
| 4,734,439 | 3/1988 | Reischl | 521/54 |
| 4,801,621 | 1/1989 | Reischl | 521/53 |
| 4,855,052 | 8/1989 | Reischl | 210/632 |

*Primary Examiner*—Maurice J. Welsh
*Attorney, Agent, or Firm*—Joseph C. Gil; Richard E. L. Henderson

[57] ABSTRACT

The present invention is directed to a process for the preparation of foam-containing polyurethane (urea) masses comprising reacting an isocyanate prepolymer containing cation groups with water in the presence of fillers. The isocyanate prepolymer is prepared by first i) reacting a polyisocyanate with a first polyol which contains partly or completely quaternized tertiary nitrogen, said polyol being prepared by reacting a tertiary amine containing compound with from 3 to 8 moles of propylene oxide per mol of nitrogen to thereby form a semi-isocyanate prepolymer and then ii) reacting said semi-isocyanate prepolymer with a second polyol different from said first polyol, to form said isocyanate prepolymer.

4 Claims, No Drawings

PROCESS FOR THE PREPARATION OF POLYURETHANE (UREA) MASSES WHICH CONTAIN FOAM

BACKGROUND OF THE INVENTION

The present invention relates to cationically modified polyurethane (urea) masses which have very high water absorption capacities. These masses are in the form of lumps or sheets (preferably in the form of lumps) and contain prefinished foams, and optionally other fillers, in particular lignite dust, magnetite and/or peat, which are bound in the polyurethane (urea) masses in an abrasion resistant form.

It is known that the preparation of materials of the type mentioned above can be carried out by the reaction of cationically modified isocyanate prepolymers having a functionality above 2.1 with a stoichiometric excess quantity of water in the presence of size reduced, prefinished foams, in particular PU foams. It is preferred to also add lignite powder, magnetite and/or peat, optionally other inorganic or organic fillers and optionally biomasses (living cells, living bacteria, enzymes).

The polyurethane(urea) masses in question contain up to 95% by weight of fillers of prefinished foam particles and optionally other fillers and at least 5% by weight of polyurethane (urea) matrix. The masses are already swelled with water and have a high water content as the result of the method of preparation.

According to the present state of the art, e.g. as disclosed in U.S. Pat. Nos. 4,608,397, 4,734,439, 4,801,621 and 4,855,052 (which correspond to European patents 151,937 and 151,938), the water absorption capacity when suspended in water is from 33 to 97% by weight of water.

The binders preferably used in U.S. Pat. No. 4,734,439, 4,801,621 and 4,855,052 are cationically modified isocyanate prepolymers, which are preferably derived from i) polyethers, ii) compounds containing tertiary nitrogen (e.g. N-methyl-diethanolamine), iii) quaternizing agents (dimethyl sulphate, polyphosphoric acid) and iv) diisocyanates (e.g a mixture of 2,4- and 2,6-diisocyanatoluene). The resulting ionically modified isocyanate prepolymers contain the ionic particles in a finely dispersed form, as evidenced by the white color of the prepolymer. The conditions employed for their preparation must be observed very accurately since the dispersed particles would otherwise tend to sediment due to their large size. The dispersion would therefore have a limited storage stability. The quality of the polyurethane-(urea) masses, and in particular the abrasion resistance of the bound fillers, is adversely affected if the particles of isocyanate prepolymer are too coarse.

DESCRIPTION OF THE INVENTION

It has now been found that special cationic isocyanate prepolymers may be used for the preparation of highly filled, particulate, abrasion resistant, foam-containing polyurethane (urea) masses having exceptionally high water absorption capacities.

The cationic isocyanate prepolymers to be used according to the invention, which serve as binders for the preparation of the polyurethane(urea) masses, have properties not hitherto obtainable by the single reaction stage method of preparation described in U.S. Pat. Nos. 4,608,397, 4,734,439, 4,801,621 and 4,855,052.

The present invention relates to a process for the preparation of foam-containing polyurethane (urea) masses from fillers, water, foams and isocyanate prepolymer binders containing cationic groups. The isocyanate used to prepare the prepolymer is a semi-isocyanate prepolymer containing cationic groups and prepared by reacting polyisocyanates with polyols containing partly or completely quaternized tertiary nitrogen propoxylated with 3 to 8 mol of propylene oxide per mol of nitrogen. The resultant semi-prepolymer is then reacted with at least one polyol to form a prepolymer which is then used to prepare the mass.

It was surprisingly found that by using from 3 to 8 mol of propylene oxide per mol of tertiary nitrogen atoms, quaternizing and reacting with polyisocyanates to form semi-isocyanate prepolymers and then reacting with polyols, transparent, storage stable isocyanate prepolymers which bind the fillers in an abrasion resistant form are obtained over a wide temperature range and over a wide range of process conditions.

The starting materials used for the process according to the invention are known and are described in U.S. Pat. Nos. 4,608,397, 4,734,439, 4,801,621 and 4,855,052, the disclosures of which are herein incorporated by reference.

The following cation group-containing compounds corresponding to the general formulae A to D are examples of compounds suitable for the process according to the invention:

Formula A:

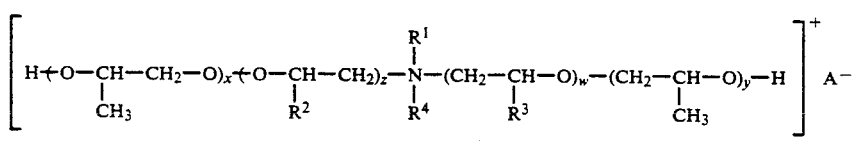

Formula B:

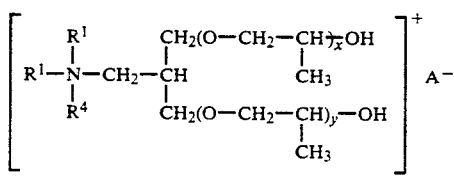

Formula C:

-continued

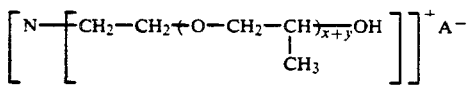

Formula D:

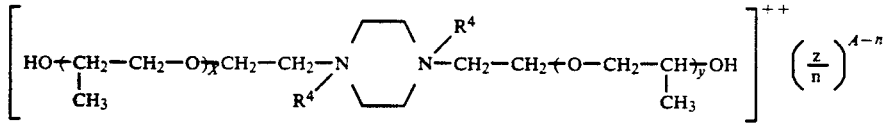

wherein $R^1$ represents an alkyl group of from 1 to 25 carbon atoms, benzyl or an alkoxy or polyalkoxy group containing a total of from 2 to 24 carbon atoms, $R^2$ and $R^3$ each represent H or $CH_3$, $R^4$ represents an alkyl group of from 1 to 25 carbon atoms or benzyl, A- represents an anion (optionally with valency n where n is a value of one or more), $0 \leq (z+w) \leq 2$, $3 \leq (x+y) \leq 8$, and $5 \leq (z+w+x+y) \leq 10$.

The following are examples of polyols containing tertiary amino groups used for propoxylation: N-methyl diethanolamine, N-methyl diisopropanolamine, N-methyl dipropanolamine, N,N-di-methylaminomethyl-propane-1,3-diol, bis(hydroxyethyl)piperazine as well as higher functional compounds such as triethanolamine. Mixtures of compounds containing tertiary amino groups may, of course, also be used.

Conversion of the propoxylated polyols containing tertiary amino groups into the corresponding ammonium compounds is carried out by means of conventional alkylating agents. Quaternization may, of course, be carried out before propoxylation.

The following are examples of suitable alkylating agents: methyl chloride and bromide, ethyl chloride and bromide, propyl chloride and bromide, isopropyl chloride and bromide, n-butyl chloride and bromide, isobutyl chloride and bromide, cyclohexyl chloride and bromide, octyl, nonyl, decyl, undecyl and dodecyl chloride and bromide, benzyl chloride and bromide, allyl chloride and bromide, dimethyl sulphate, the methyl and ethyl esters of o,p-toluene sulphonic acid, ethyl chlorohydrin, ethylene bromohydrin and epichlorohydrin. Mixtures of alkylating agents may, of course, also be used.

The compounds preferably used are o,p-toluene sulphonic acid methyl ester and/or benzyl chloride.

Very advantageous results are obtained when a small proportion of o,p-toluene sulphonic acid methyl ester or other alkylating agent or mixture of alkylating agents of the quaternizing agent required for molar quaternization is replaced by an acid such as p-toluene sulphonic acid or phosphoric acid so that the aqueous solution of ammonium salt has a pH of, preferably, less than 7 (1 g of salt/10 g of water).

The propoxylated polyols containing quaternary ammonium groups are then reacted with polyisocyanates to form cationically modified isocyanate prepolymers.

The polyisocyanates used are di- and/or polyfunctional polyisocyanates such as, for example, hexane diisocyanate, dicyclohexyl methane diisocyanate or isophorone diisocyanate but preferably aromatic di- and polyisocyanates such as the toluene diisocyanate isomers, diphenyl methane-4,4'- and/or 2,4'- and/or 2,2'-isomers and optionally the relatively high molecular weight polyphenyl-polymethylene polyisocyanates obtained by the phosgenation of crude formaldehyde/aniline condensation products (polyamine mixtures) and optionally used as undistilled sump products. The polyisocyanates used for the reaction may also be any known polyisocyanates such as those described in detail in, for example, German Offenlegungsschrift 2,832,253.

In the last step, the cationically modified isocyanate prepolymers are reacted with relatively high molecular weight polyhydroxyl compounds to form isocyanate prepolymers, which are the binders proper. The isocyanate prepolymers obtained generally have an isocyanate functionality of from 2.1 to 3.5, preferably from 2.2 to 2.8, and an isocyanate content of from 2.0 to 12.0% by weight, preferably from 2.5 to 8.0% by weight.

The relatively high molecular weight polyhydroxyl compounds used are generally known in the polyurethane art. They typically have molecular weights of from 400 to 10,000, and preferably from 800 to 8000, and are typically difunctional and/or higher functional polyols having functionalities of $\leq 2.1$, preferably from 2.5 and up to about 5, and most preferably from 2.1 to 3.5.

The polyhydroxyl compounds used may be polyesters, polycarbonates, polylactones or, most preferably, bifunctional and trifunctional polyether compounds which are more resistant to hydrolysis.

The process according to the invention is generally carried out as follows:

1. Quaternization (salt formation)

Conversion of the polyol or polyol mixture containing tertiary amino groups propoxylated with 3 to 8 mol of propylene oxide into the corresponding ammonium compounds is carried out by a reaction with the alkylating agent or mixture of alkylating agents in solution or, preferably, solvent free at temperatures from 20° to 180° C., preferably from 40° to 150° C., and most preferably from 50° to 90° C.

2. Cationically modified semi-isocyanate prepolymer

The quaternized, propoxylated polyols are reacted with polyisocyanates at temperatures from 40° to 120° C., preferably from 60° to 100° C., most preferably from 70° to 95° C., to form the cationically modified isocyanate semi-prepolymers which have an isocyanate content of from 5 to 46.0% by weight, preferably from 10 to 40% by weight, most preferably from 30 to 40% by weight.

3. Isocyanate prepolymer binder

The cationically modified isocyanate semi-prepolymers are reacted with the relatively high molecular weight polyhydroxyl compounds by the usual methods, e.g. by heating the components together at temperatures from 50° to 100° C. to form the isocyanate prepolymer binder having an isocyanate content of from 2 to 12% by weight, preferably from 2.5 to 8.0% by weight and an isocyanate functionality of from 2.1 to 3.5, preferably from 2.2 to 2.8. The quantity of cationic groups built into the molecule is generally less than 2000 mmol/kg of polyurethane solids content, preferably from 30 to 1500 mmol/kg and most preferably from 50 to 500 mmol/kg of polyurethane solids content.

It was surprising that only the three stage process described above carried out with the special propoxylated ammonium salts led to isocyanate prepolymer binders which were clear or only slightly cloudy. The process according to the invention therefore provides:
a) improved reproducibility of the preparation of the isocyanate prepolymer binder over a wide range of temperatures and process conditions,
b) the preparation of a transparent isocyanate prepolymer binder resistant to sedimentation,
c) considerable improvement in storage stability,
d) in the preparation of polyurethane (urea) masses, prolonged pump life due to reduced risk of blockage since the isocyanate prepolymer binders are resistant to sedimentation and stable in storage, and
e) the maintenance of a constant level of properties of the polyurethane (urea) masses, in particular in that the fillers are bound in an abrasion resistant form.

The process according to the invention is described in more detail below with the aid of the following examples (parts denote parts by weight).

EXAMPLES

Comparison Example 1: One-stage process not according to the invention

A mixture of 34.2 parts of a linear hydrophobic polyether of 1,2-propane diol and propylene oxide (OH number 56), 41.8 parts of a branched hydrophobic polyether (started on trimethylol propane, reacted with 80 parts of propylene oxide and thereafter with 20 parts of ethylene oxide; OH number 35) and 1.5 parts of N-methyl diethanolamine is cooled to about 60° C. after it has been dehydrated under vacuum at about 80° C. for 1 hour. The mixture is then reacted with 20.2 parts of TDI (isomeric mixture 80:20 of 2,4- and 2,6-toluene diisocyanate). 2.3 parts of o,p-toluene sulphonic acid methyl ester are immediately added as quaternizing agent after all of the TDI has been added. The reaction temperature rises to 70°–75° C. When the theoretical isocyanate value has been reached, a cloudy, white prepolymer is obtained.

Employing the process described above, N-methyl-diethanolamine was replaced by 1.85 g of N-methyl-di-(2-hydroxypropyl)-amine or by 4.13 g of N-methyl-diethanolamine propoxylated with 4 mol of PO ("PO-N-MDA") as tertiary amine.

The results of these experiments are summarized in Table 1.

TABLE 1

| Tertiary amine | viscosity*** after preparation (mPa.s) at 75° C. | Ground settlement* | Emulsifiability (sec**) | Viscosity (mPa.s) at 25° C. after storage at 80° C.*** |
|---|---|---|---|---|
| N-methyl-diethanolamine | 9800 | present after 24 h | ≦20 | — |
| N-methyl-diisopropanolamine | 14,000 | None | <5 | Cross linked |
| PO-N-MDA | 4000 | None | <15 | >300,000 |

*Particles precipitated in the prepolymer (for example, short chain hard segments).
**Emulsifiability: 100 g of isocyanate prepolymer and 200 g of water are mixed at room temperature for 30 seconds with vigorous stirring. The emulsifiability is the time in seconds after which phase separation or coagulation takes place.
***With exclusion of moisture.

Comparison Example 2: Two stage process not according to the invention

Stage 1: preparation of salt 39.5 parts of N-methyl-diethanolamine are heated to 80° C. in a vessel equipped with a stirrer and 60.5 parts of p-toulene sulphonic acid methyl ester are continuously added at such a rate that a temperature of 75°–85° C. is obtained in the highly exothermic reaction.

Stage 2: isocyanate prepolymer 3.8 parts of the salt from Stage 1 are dehydrated with 76 parts of the polyether mixture used in Comparison Example 1 at 80° C. and then reacted with 20.2 parts of TDI (isomeric mixture 80:20 of 2,4- and 2,6-tolylene diisocyanate) at about 60° to 70° C. until the theoretically calculated isocyanate content is obtained. The reaction temperature rises by about 5° to 10° C. When the theoretical isocyanate value is reached, a cloudy white prepolymer is obtained.

N-methyl-diethanolamine is replaced in the process described above by 1.85 g of N-methyl-di-(2-hydroxypropyl)-amine or by 4.13 g of a N-methyl-diethanolamine propoxylated with 4 mol of PO (PO-N-MDA) as tertiary amine.

The results of these experiments are summarized in Table 2.

TABLE 2

| Tertiary amine | Viscosity*** after preparation (mPa.s) at 25° C. | Ground Settlement | Emulsifiability (sec) |
|---|---|---|---|
| N-methyl-diethanolamine | 4,100 | after 24 h | <20 |
| N-methyl-diisopropanolamine | 5,500 | after 24 h | <5 |
| PO-N-MDA | 3,300 | after 3 days | 15 |

Example 3: Three stage process according to the invention

Stage 1: preparation of salt: prepared as in Comparison Example 2

Stage 2: semi NCO-prepolymer

The salts based on N-methyl-diethanolamine and N-methyl-diisopropanolamine can no longer be worked up in the second stage. The reaction with TDI results in solid products.

14.2 parts of a salt from Stage 1 consisting of 63.6 parts of PO-N-MDA and 36.4 parts of o,p-toluene sulphonic acid methyl ester are added to 85.8 parts of TDI at such a rate that the temperature of the reaction mixture does not exceed 100° C. The product obtained after termination of the reaction (when the theoretical isocyanate content is reached) is a liquid product which is clear at room temperature.

Stage 3: Isocyanate prepolymer 76.7 parts of the polyether mixture from Comparison Example 1 are reacted with 23.3 parts of the semi-NCO-prepolymer from Stage 2 at 60° to 70° C. until the theoretical isocyanate content is obtained. The transparent isocyanate prepolymer has a viscosity of about 6000 determined at 25° C. (mPa.s) and a viscosity (25° C.) of <8000 (mPa.s) after 3 days storage at 80° C. Emulsifiability: 90 (s).

Preparation of Polyurethane (urea) masses

The apparatus used consisted of two double paddle screw troughs each having a volumetric capacity of about 180 liters and a length of 300 cm. The troughs were arranged in series and their paddle shafts were rotated in opposite directions. The reaction mixture was forced from the inlet opening in the direction of the outlet opening and was subjected to kneading and squeezing between the shafts.

72 kg/h of MA 2538 foam (manufactured by Metzeler)(average particle size <10 mm) are fed into the hopper from a belt weigher and 148.4 kg/h of lignite dust (average particle size <200 μm) are fed in from a dosing screw.

62.4 kg/h of the isocyanate prepolymer of Example 3 was mixed with 523 kg/h of water in a 1.5 liter porcupine mixer and also fed into the hopper. 27.6 kg/h of a second basic prepolymer with an NCO-content of about 6% by weight and stabilized with phosphoric acid (U.S. Pat. No. 4,855,052) are measured into the first third of the second paddle screw. The second prepolymer had been obtained by reaction of a polyether with a OH-number 26 (obtained by conversion of propylene oxide and ethylene oxide at a ratio of 40:60 with trimethylol propane as the starter) and N-methyl-diethanolamine and toluene diisocyanate (2,4- and 2,6-isomeric mixture 80:20).

The prepolymers are introduced in measured quantities via a gear wheel pump and the water via a quantity control.

The last third of the first paddle screw and the whole of the second screw are heated with a stream of steam (6 bar).

After a dwell time of about 5.5 minutes in both screws, the vigorously mixed product leaves at a temperature of about 42° C. and is mixed with 5000 l/h of water at 50° C. in a hopper and transferred via a pump and a stationary region (diameter 100 mm, length 80 m) to a perforated flow belt and into a perforated vessel. The dwell time is about 6 minutes. The product has completely reacted and may be filled into containers after the excess water has dripped off.

Properties:

Total solids per liter of suspension was 95–120 g/l; abrasion in the ball mill test: about 6%, which corresponds to products produced according to U.S. Pat. No. 4,855,052.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the preparation of foam-containing polyurethane (urea) masses comprising reacting an isocyanate prepolymer containing cation groups with water in the presence of fillers, the improvement wherein the isocyanate prepolymer is prepared by first i) reacting a polyisocyanate with a first polyol which contains partly or completely quaternized tertiary nitrogen, said polyol being prepared by reacting a tertiary amine containing compound with from 3 to 8 moles of propylene oxide per mol of nitrogen to thereby form a semi-isocyanate prepolymer and then ii) reacting said semi-isocyanate prepolymer with a second polyol different from said first polyol, to form said isocyanate prepolymer.

2. The process of claim 1, wherein said polyisocyanate comprises a mixture of toluene diisocyanate isomers.

3. The process of claim 1, wherein said first polyol has a propylene oxide content of 4 moles per mole of quaternary nitrogen.

4. The process of claim 1, wherein said first polyol is a quaternized propoxylated N-methyl-diethanolamine.

* * * * *